(12) United States Patent
Benco (10) Patent No.: US 9,439,048 B2
(45) Date of Patent: Sep. 6, 2016

(54) METHOD AND APPARATUS FOR PROVIDING MOBILE-TO-MOBILE VIDEO CAPABILITY TO A NETWORK

(75) Inventor: David S. Benco, Winfield, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 1111 days.

(21) Appl. No.: 10/698,783

(22) Filed: Oct. 31, 2003

(65) Prior Publication Data

US 2005/0095981 A1    May 5, 2005

(51) Int. Cl.
| H04W 4/12 | (2009.01) |
| H04W 4/16 | (2009.01) |
| H04W 88/18 | (2009.01) |

(52) U.S. Cl.
CPC ............... *H04W 4/12* (2013.01); *H04W 4/16* (2013.01); *H04W 88/184* (2013.01)

(58) Field of Classification Search
USPC ....... 455/3.01, 3.03–3.05, 412.1–412, 414.4, 455/466, 3.06, 412.2; 709/204, 206, 207
See application file for complete search history.

(56) References Cited

U.S. PATENT DOCUMENTS

| 5,442,390 | A | * | 8/1995 | Hooper et al. ................... 725/90 |
| 7,289,792 | B1 | * | 10/2007 | Turunen ..................... 455/414.1 |
| 2001/0044325 | A1 | * | 11/2001 | Cox et al. ...................... 455/565 |
| 2002/0037712 | A1 | | 3/2002 | Shin |
| 2002/0080943 | A1 | | 6/2002 | Jin et al. |
| 2002/0132608 | A1 | * | 9/2002 | Shinohara ..................... 455/412 |
| 2003/0045273 | A1 | * | 3/2003 | Pyhalammi et al. ......... 455/412 |
| 2003/0105825 | A1 | * | 6/2003 | Kring et al. .................. 709/206 |
| 2004/0103434 | A1 | * | 5/2004 | Ellis ............................... 725/58 |
| 2004/0207719 | A1 | * | 10/2004 | Tervo et al. ............... 348/14.02 |

FOREIGN PATENT DOCUMENTS

GR    2 338 150 A    8/1999

OTHER PUBLICATIONS

Communication.

* cited by examiner

*Primary Examiner* — Raymond Dean
(74) *Attorney, Agent, or Firm* — Fay Sharpe LLP (57) ABSTRACT

This invention relates to a method and apparatus for providing mobile-to-mobile video capability to a network. More particularly, this development is directed to a system that facilitates the transmission of video data from one mobile station (e.g. wireless phone) to another mobile station (e.g. another wireless phone). It also provides user control of the transmission to accommodate the preferences of the called party relative to receipt of the data.

17 Claims, 7 Drawing Sheets

| MOBILE SUBSCRIBER DATABASE (HLR/VLR) | | | |
|---|---|---|---|
| SUBSCRIBER ID (22-1) | SUBSCRIBER (22-2) | VIDEO ENABLED (22-3) | PREFERENCE (22-4) |
| SUBSCRIBER #1 | YES | YES | DELAYED |
| SUBSCRIBER #2 | NO | NO | — |

FIG. 8
NETWORK SUPPORT FOR MOBILE-TO-MOBILE VIDEO (CONDITIONAL DELIVERY)

METHOD AND APPARATUS FOR PROVIDING MOBILE-TO-MOBILE VIDEO CAPABILITY TO A NETWORK

BACKGROUND OF THE INVENTION

This invention relates to a method and apparatus for providing mobile-to-mobile video capability to a network. More particularly, this development is directed to a system that facilitates the transmission of video data from one mobile station (e.g. wireless phone) to another mobile station (e.g. another wireless phone), referred to herein as mobile-to-mobile video. It also provides user control of the transmission to accommodate the preferences of the called party relative to receipt of the data.

While the invention is particularly directed to the art of mobile-to-mobile video transmission, and will be thus described with specific reference thereto, it will be appreciated that the invention may have usefulness in other fields and applications. For example, the invention may be adapted and used in other mobile-to-mobile data transmissions.

By way of background, mobile-to-mobile video capability with user control is not presently known in the marketplace. Of course, systems exist which provide for the recording of video and transmission of the video data to a web site for subsequent viewing. These systems, however, do not provide a mobile-to-mobile video capability nor do such systems provide for the desired user control. Other systems on the market allow for the communication of still photographs from one mobile system to another. However, these systems do not provide for the desired user control. Also, these systems do not involve streaming video data, only still image data.

The present invention contemplates a system for providing mobile-to-mobile video capability to a network that resolves the above-referenced difficulties and others.

SUMMARY OF THE INVENTION

A method and apparatus for providing mobile-to-mobile video capability to a network are realized by the present invention.

In one aspect of the invention, the system comprises a call recognition module operative to recognize a call from the first mobile station to the second mobile station as including video data and, if the video data is present, validating the second mobile station as capable of receiving the video data and determining a delivery preference for the second mobile station, a storage module operative to have stored therein the video data, an announcement module operative to selectively prompt, based on the delivery preference, the second mobile station if the second mobile station is validated, receive a response to the prompt from the second mobile station and selectively forward the response and a control module operative to store the video data in the storage module upon recognition, receive the response from the prompt module and, based on the response, perform at least one of maintaining the video data in the storage module, deleting the video data from the storage module, and forwarding the video data to the second mobile station.

In another aspect of the invention, the call recognition module validates the second mobile station by performing a look-up operation on a mobile subscriber database.

In another aspect of the invention, the storage module is a first-in, first-out buffer.

In another aspect of the invention, the prompt comprises a ringing tone.

In another aspect of the invention, the prompt comprises an announcement.

In another aspect of the invention, the response comprises at least one of a rejection of the video data, a request for immediate delivery of the video data, and a request for delayed delivery of the video data.

In another aspect of the invention, a call origination module is operative to originate, based on the delivery preference, a subsequent call to the second mobile station to selectively prompt, based on the delivery preference, the second mobile station if the second mobile station is validated, receive the response to the prompt from the second mobile station and selectively forward the response to the control module.

In another aspect of the invention, the announcement module provides a signal to the first mobile station that delivery will be blocked if the call recognition module does not validate the second mobile station.

In another aspect of the invention, the control module deletes the video data from the storage module if the call recognition module does not validate the second mobile station.

In another aspect of the invention, the method comprises recognizing a call from the first mobile station to the second mobile station as including the video data, if the video data is present, validating the second mobile station as capable of receiving the video data and determining a delivery preference for the second mobile station, storing the video data in a storage module, selectively prompting, based on the delivery preference, the second mobile station if the second mobile station is validated, receiving a response to the prompt from the second mobile station and based on the response, performing at least one of maintaining the video data in the storage module, deleting the video data from the storage module, and forwarding the video data to the second mobile station.

In another aspect of the invention, the validating of the second mobile station comprises performing a look-up operation on a mobile subscriber database.

In another aspect of the invention, the prompting comprises providing a ringing tone.

In another aspect of the invention, the prompting comprises providing an announcement.

In another aspect of the invention, the response comprises initiating at least one of a rejection of the video data, a request for immediate delivery of the video data, and a request for delayed delivery of the video data.

In another aspect of the invention, the method further comprises originating, based on the delivery preference, a subsequent call to the second mobile station, selectively prompting, based on the delivery preference, the second mobile station if the second mobile station is validated, receiving the response to the prompt from the second mobile station and selectively forwarding the response to the control module.

In another aspect of the invention, the method further comprises providing a signal to the first mobile station that delivery will be blocked if the second mobile station is not validated.

In another aspect of the invention, the method further comprises deleting the video data from the storage module if the second mobile station is not validated.

In another aspect of the invention, the system comprises means for recognizing a call from the first mobile station to the second mobile station as including the video data, means for validating the second mobile station as capable of receiving the video data and determining a delivery preference for the second mobile station, means for storing the video data in a storage module, means for selectively prompting the second mobile station if the second mobile station is validated, means for receiving a response to the prompt from the second mobile station and means for performing, based on the response, at least one of maintaining the video data in the storage module, deleting the video data from the storage module, and forwarding the video data to the second mobile station.

In another aspect of the invention, the response comprises at least one of a rejection of the video data, a request for immediate delivery of the video data, and a request for delayed delivery of the video data.

In another aspect of the invention, the system further comprises means for originating, based on the delivery preference, a subsequent call to the second mobile station, means for selectively prompting, based on the delivery preference, the second mobile station if the second mobile station is validated, means for receiving the response to the prompt from the second mobile station and means for selectively forwarding the response to the control module.

In another aspect of the invention, the system further comprises means for providing a signal to the first mobile station that delivery will be blocked if the second mobile station is not validated.

In another aspect of the invention, the system further comprises means for deleting the video data from the storage module if the second mobile station is not validated.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
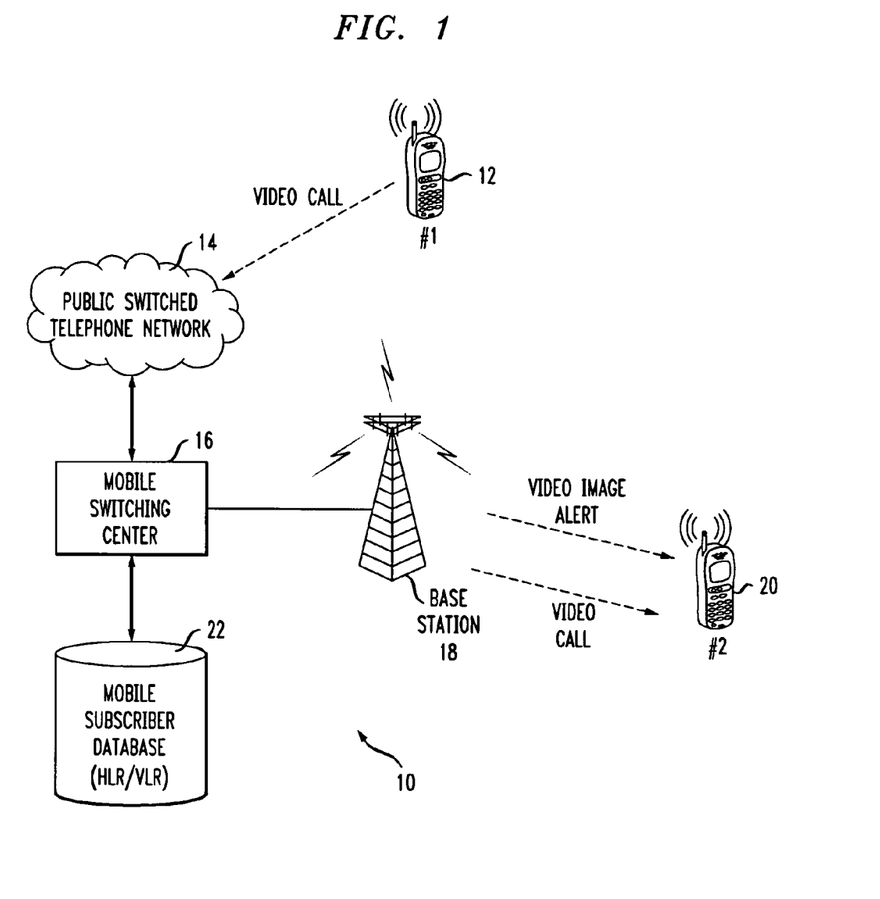
FIG. 1 is an illustrative view of an exemplary network into which the present invention may be incorporated.

Referring now to the drawings wherein the showings are for purposes of illustrating the preferred embodiments of the invention only and not for purposes of limiting same, FIG. 1 provides a view of an overall system into which the present invention may be incorporated. As shown, a network 10 includes a mobile station #1, identified by reference numeral 12, communicating a video call to a public switched telephone network (PSTN) 14. Although not specifically shown, this involves communication of the call through a variety of wireless network components before actually being transmitted through the public switched telephone network (PSTN) 14. Of course, that which is illustrated is only an example. In other embodiments, the mobile station 12 may communicate solely in wireless networks. As shown, however, the public switched telephone network (PSTN) 14 is connected to a mobile switching center (MSC) 16 that communicates with a base station 18. In the configuration shown, the base station 18 communicates a video image alert and a subsequent video call to mobile station #2, identified by reference numeral 20. In an exemplary embodiment of the invention, a mobile subscriber database 22 is also in communication with the mobile switching center (MSC) 16.

Significantly, as shown in FIG. 1, the present invention provides mobile-to-mobile video capability to the network 10. It does so using some components that are illustrated and well known in the art and other selected components which include modification to implement the invention. Specifically, the mobile subscriber database 22 includes at least one extra data field to identify users that subscribe to the mobile-to-mobile video capability of the present invention. This modification may be implemented by simply adding a field or fields to the already existing database wherein a flag or marker can be set or reset to indicate subscription to the mobile-to-mobile video features. Further information may also be stored in additional fields of the database—or accessible through information obtained from the mobile subscriber database (e.g. a pointer to another database)—to allow for efficient implementation of the system. For example, this further information may include specifications on the mobile station of the subscriber (e.g. video enablement) or information on the delivery preferences of the subscribers (e.g. immediate, delayed, blocked or conditional).

Figure 2:
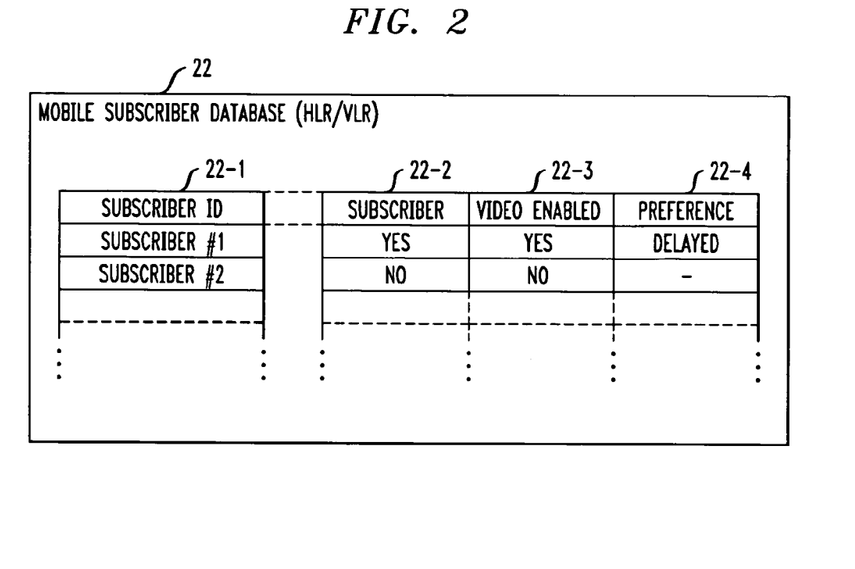
FIG. 2 is a illustrative view of a database according to the present invention.

In this way, the mobile subscriber database will take forms that are well known in the art with the modifications noted above. For ease of explanation, an illustrative view of the subscriber database 22 is shown in FIG. 2. As illustrated, the database 22 includes a subscriber identification field 22-1, a subscriber data field 22-2, a video enabled data field 22-3 and a preference data field 22-4. Of course, the database 22 will typically have other data fields that are not shown but known in the art. In addition, the actual form of data stored in the illustrated fields will vary from application to application. For example, the "YES" and "NO" data entries may actually take the form of "set" or "reset" flag. The "DELAYED" indication may take the form of another machine readable code. The subscriber identification field data may take forms that are well known or others.

In addition, the mobile switching center 16 includes modifications. In this regard, referring now to FIG. 3, the mobile switching center (MSC) 16 includes a video call recognition module 30, an announcement module 32, a control module 34, a call origination module 36, and a video storage module 38. It is to be appreciated that the modules identified are those that are added or modified to implement the present invention. Those with skill in the art will understand that the mobile switching center (MSC) 16 includes a variety of other components (not shown) that provide functioning of the mobile switching center (MSC) 16 that is well known in the art.

It should be further understood that the present invention may also be implemented in a system that does not have a mobile switching center (MSC), per se. In such a case, modifications similar to those discussed herein for the mobile switching center (MCS) 16 could be made to a network element having similar responsibility for switching.

Figure 3:
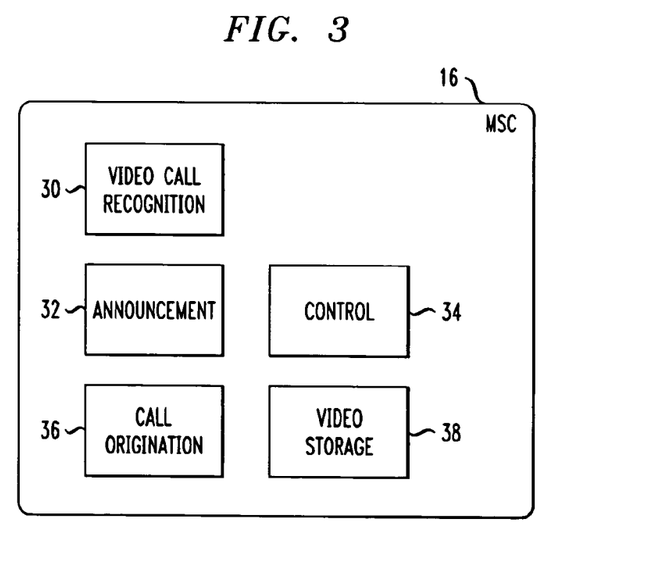
FIG. 3 is a block diagram of an exemplary mobile switching center (MSC) according to the present invention.

As to the components identified in FIG. 3, the functions and interactions of which will be more fully described in connection with FIGS. 4-8, the video call recognition module 30 is provided to recognize video calls from mobile stations and to determine the status of the called party. The detection of the presence of a call having video data is accomplished in known manners. The video call recognition module 30 accomplishes the task of determining the status of the called party by querying the mobile subscriber database 22 to determine if the called party subscribes to the mobile-to-mobile video service (e.g., access the subscriber identification data field 22-1 and the subscriber data field 22-2) and has a video enabled mobile station (e.g., access the video enabled data field 22-3). The delivery preferences of the called subscriber are also determined by the call recognition module 30 through the use of a query to the mobile subscriber database 22 (e.g. preference data field 22-4). The status of the called party may also be determined by implementing additional steps of prompting the called party by using the announcement module 32. In prompting the called party, or mobile station 20, the announcement software may ring the mobile station or phone and play a message. The announcement module 32 also receives the response to any prompts and sends that information on to the appropriate modules within the mobile switching center (MSC) 16. Techniques for generating and transmitting announcements and dealing with responses are well known.

The video storage module 38 stores video data that comprises the video calls that are received by the video call recognition module 30. The video storage module 38 is preferably a first-in, first-out buffer that stores the video calls upon recognition by the video call recognition module 30. The ultimate treatment of the stored video is determined by the status of the called party and the delivery preference of the called party. These preferences are carried out by the control module 34 which controls the stored video in response to the responses of the called party, or mobile phone 20.

A call origination module 36 is also provided. This module is operative to originate subsequent calls to the mobile phone 20, or called party, in the event that the called party's delivery preference is to store and forward the video at a later time. Call origination techniques are well known in the art.

Figure 4:
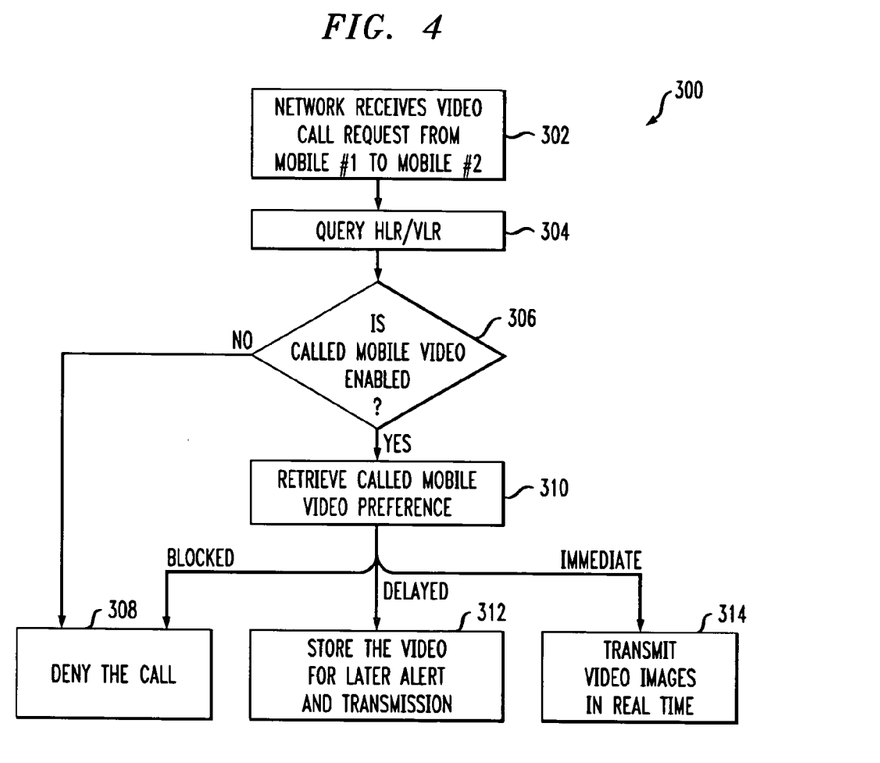
FIG. 4 is a flow chart illustrating an exemplary method according to the present invention.

Referring now to FIG. 4, an exemplary method according to the present invention is illustrated. As shown, the method 300 begins with the network, or mobile switching center (MSC) 16, receiving a video call request from mobile station 12 to mobile station 20 (step 302). The video call is, of course, then recognized by the video call recognition module 30 using known techniques. It is also presumed that, if the mobile station 12 is transmitting video data, it subscribes to an appropriate service to do so in appropriate manners with suitable authorization. At that point, the MSC queries the appropriate home location register or visiting location register 22 to determine the location of the mobile station 20 and to make appropriate queries to the subscriber database 22 (step 304).

Next, the video call recognition module 30 queries the mobile subscriber database 22 to determine whether the called party, i.e. mobile station 20, is video enabled and subscribes to the appropriate service (step 306). As noted above, the appropriate new fields added to the database are accessed to make this determination. If it is determined that the called mobile station is not video enabled and/or the called party does not subscribe to the appropriate service, the call is denied and an appropriate message is forwarded back to mobile station 12. If, however, the mobile station 20 is capable of receiving the video call, the mobile subscriber database also is queried to determine the video data delivery preference of the owner of mobile station 20 (step 310) and the video data is stored in the video storage module 38. Again, the appropriate new fields (e.g., 22-2, 22-3 and 22-4) of the database 22 (FIG. 2) are accessed. Based on this determination, the call is denied and the video data is deleted from the video storage module 38 (step 308) if the customer preference is to "block" the call (step 308). The video data is immediately transmitted from the video storage module 38 to the mobile station 20 (step 314) if the user preference indicates such action to be taken. If the user preference is to delay the transmission of video data to mobile station 20, the video data remains stored in the video storage module 38 and is later transmitted by way of call origination module 36 (step 312).

It is to be appreciated that FIG. 4 illustrates a mere example of a method according to the present invention. In this regard, variations exist. For example, a user preference for delivery could be "conditional" (as will be described in connection with FIG. 8). In this case, the user of mobile station 20 would be prompted to provide its delivery preference (e.g. block, delay, immediate) for each video call.

To more fully appreciate the features of the invention, a number of exemplary scenarios are described in connection with the call flows, or sequence diagrams, of FIGS. 5-8. In this regard, referring now to FIG. 5, a call flow 400 illustrates a situation where a call is blocked because the called party does not subscribe to the mobile-to-mobile video feature or does not use a video enabled mobile station, e.g. phone.

Figure 5:
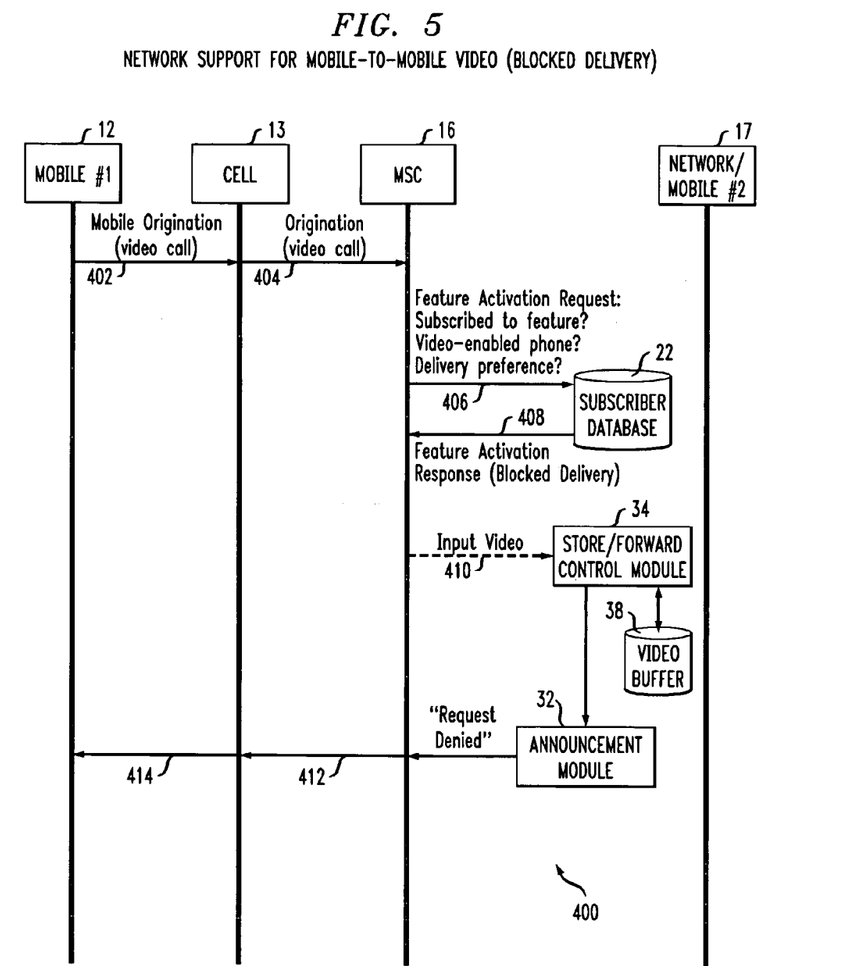
FIG. 5 is a call flow, or sequence, diagram illustrating exemplary features of the present invention.

As shown, a valid and authorized video call from mobile station 12 is transmitted to a cell site, or base station, 13 (line 402). The cell site 13 then transmits the call to mobile switching center (MSC) 16 (line 404). At this point, the video data is stored in the video buffer 38 through the control module 34 (line 410) and the video call recognition module 30 of mobile switching center (MSC) 16 determines if the called party, or owner of mobile station 20, subscribes to the mobile-to-mobile video feature and uses a video enabled mobile station. The video call recognition module 30 also determines the delivery preference of the called party—if the called party is able to receive a video call based on the former determinations. These queries are made by the video call recognition module 30 to the mobile subscriber database 22. The database 22 responds to the query (line 408) and appropriate action is taken. In the illustrated scenario, it is determined that the called party is not able to receive the video call because it does not subscribe to the service, it does not have a video enabled mobile station, or it is simply blocking all video calls. At this point, the video that was input to the control module 34 (line 410) upon recognition of the video call by the video call recognition module is deleted from the video buffer 38. The control module 34 also provides an instruction to announcement module 32 to indicate to the mobile station 12 that its request is denied (lines 412 and 414).

Figure 6:
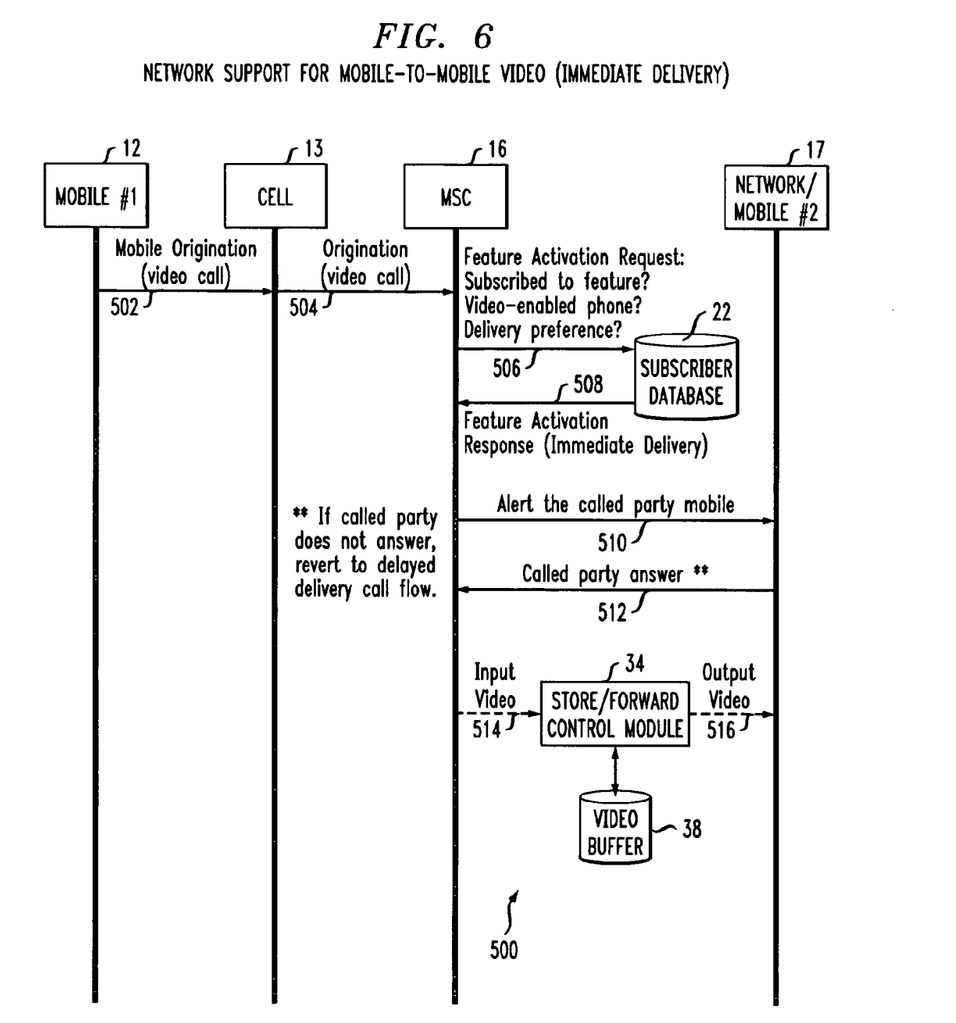
FIG. 6 is a call flow, or sequence, diagram illustrating exemplary features of the present invention.

Referring now to FIG. 6, the scenario involving immediate delivery of the video data to the called party is illustrated. As shown, a valid and authorized video call originates with mobile station 12 and is transmitted to a cell site 13 (line 502). It is then forwarded on to a mobile switching center (MSC) 16 (line 504). At the video call recognition module 30 of the mobile switching center (MSC) 16, a determination is made as to whether the called party, or mobile station 20, subscribes to the mobile-to-mobile video feature and has a video enabled mobile station. Also, the video data is stored in the video buffer 38 through the control module 34 (line 514). If the user from mobile station 20 has a video enabled mobile station and subscribes to the feature, the video call recognition module determines the delivery preference for the user of mobile station 20 (line 506). The information from the subscriber database 22 is then forwarded back to the video call recognition module 30 of the mobile switching center (MSC) 16 (line 508). In this scenario, immediate delivery is the delivery preference for the user so the called party is alerted (line 510). The announcement module 32 is used for this purpose. The mobile station 20 answers the call (line 512). Then, the video data which was input to the video buffer 38 through the control module 34 (line 514) is output to the mobile station 20 (line 516). It is to be appreciated that the video buffer 38 includes a first-in, first-out memory so that the delivery of the call can be a near real time delivery. It is to be further appreciated that if the called party does not answer the call in these circumstances, the method that will be described in connection with FIG. 7 is used.

Figure 7:
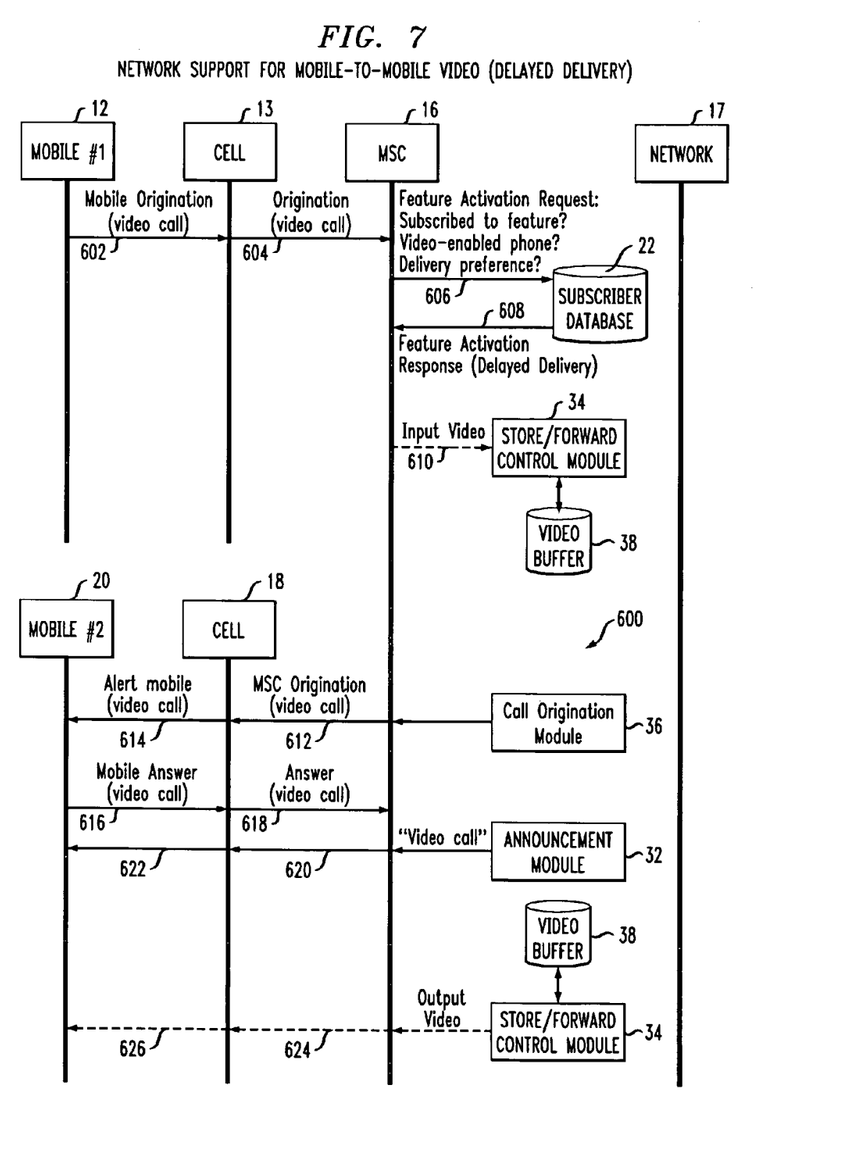
FIG. 7 is a call flow, or sequence, diagram illustrating exemplary features of the present invention; and, FIG. 8 is a call flow, or sequence, diagram illustrating exemplary features of the present invention.

In this regard, a call flow 600 is illustrated in FIG. 7. The call flow is applicable where a user delivery preference calls for a delay in delivery or when a user does not answer a video call when having an immediate delivery preference.

More specifically, the call flow 600 begins with a valid and authorized video call origination at mobile station 12, such video call being forwarded to a cell site 13 (line 602). Cell site 13 then forwards the video call to a mobile switching center (MSC) 16 (line 604). As above, the video data is stored in buffer 38 through control module 34 (line 610). The video call recognition module 30 of the mobile switching center (MSC) 16 determines from the subscriber database 22 whether the called party, or mobile station 20, subscribes to the mobile-to-mobile video feature and uses a video enabled mobile station. The video recognition module 30 also determines the delivery preference of the user of mobile station 20, if the mobile station 20 is able to receive a video call (line 606). The information from the database is transmitted back to the video recognition module 30 (line 608). If the user of mobile station 20 is able to receive a video call, i.e., subscribes to the mobile-to-mobile video feature and has a video enabled mobile station, and specifies a delivery preference of "delayed delivery," then the video data is maintained in the video buffer, or storage module, 38.

The video data in the video buffer 38 is stored until such time as is indicated by the delayed delivery procedures. In this regard, the user may provide a time in which to deliver all video calls to it and specify that time in the subscriber database. For example, a user may select the evening as a time in which to view video calls. The delivery preference may also be managed based on a timer. As a further alternative, the delivery may be prompted by the user at a particular time. In any case, at the appropriate time, call origination module 36 initiates a call from the mobile switching center (MSC) 16 to the mobile station 20. This call, of course, is transmitted to a cell site 18 (line 612) and ultimately transferred to the mobile station 20 (line 612). If the mobile station 20 answers the video call, the acknowledgement is forwarded to the cell site 18 (line 616) and then to the mobile switching center (MSC 16) (line 618). Announcement module 32 of the MSC then transmits an announcement to the mobile station 20 that a video call will be sent thereto (lines 620 and 622). Announcement module 32 then initiates transfer of the video data by way of the control module 34 from the video buffer, or storage module, 38. The video data call is then sent from the mobile switching center (MSC) 16 to the mobile station 20 (lines 624 and 626).

The call flows of FIGS. 5-7 are based on the MSC 16 determining a delivery preference for the second mobile station 20 by way of querying the subscriber database 22 which, as described above, is modified to accommodate the present invention in manners as described by example in connection with FIG. 2. It may well be that a user would prefer to determine a delivery preference on a call-by-call basis. In this case, a delivery preference of "conditional delivery" is provided by the present invention. This will allow the mobile switching center (MSC 16) to prompt the user of the mobile station 20 to obtain a response and act according to the response—as opposed to simply delivering the message as indicated in the database.

Figure 8:
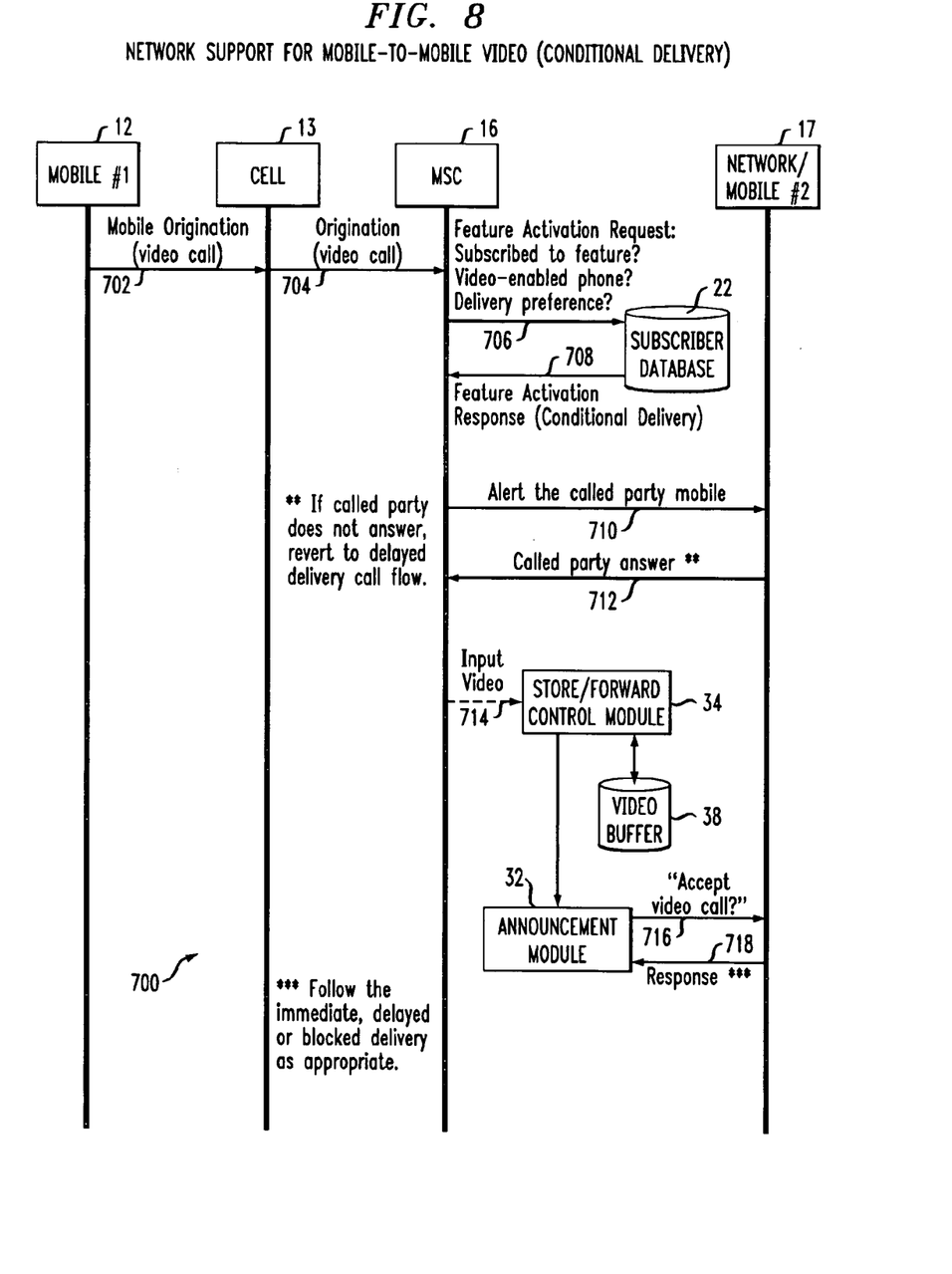

More particularly, referring now to FIG. 8, call flow 700 illustrates a valid and authorized video call origination at a mobile station 12 wherein the video call is transmitted to a cell site 13 (line 702). The video call is ultimately transmitted to the mobile switching center (MSC) 16 (line 704). The video call recognition module 30 of the mobile switching center (MSC) 16 then queries the subscriber database 22 to determine if the user of the mobile station 20 subscribes to mobile-to-mobile video feature and has a video enabled mobile station. As above, the video data is stored (line 714). As with the other call flows, the call recognition module 30 also determines the delivery preference of the user of the mobile station 20 (line 706). Information from the database is transmitted back to the mobile switching center (MSC) 16 (line 708). In this case, where the delivery of preference is conditional, the mobile switching center (MSC) 16 alerts the called party mobile station 20, via a ringing tone, and the called party answers (lines 710 and 712). At this point, the announcement module 32 makes an announcement to the mobile station 20, making inquiry as to whether mobile station 20 will "accept the video call" (line 716). The mobile station 20 then responds to the announcement module 32 by indicating whether it prefers an immediate, delayed or blocked delivery (line 718). This may be accomplished through a menu downloaded from the network and/or key strokes or other techniques. The mobile switching center (MSC) 16 then acts accordingly, as will be apparent from FIGS. 5-7.

It is to be appreciated that the input video data is stored in the video buffer 38 via the control module 34 upon recognition of the call recognition module that a video is contained in a call (line 714). This storage, as with the other embodiments, will typically occur for every call. Whether the video buffer maintains the video data, deletes the video data, or forwards the video data depends on the delivery preference of the user of the second mobile station 20.

The present invention allows video enabled mobile handsets to transmit or exchange video information in real time or in delayed time. These handsets may take a variety of forms such as wireless phones, personal digital assistants (PDAs), or the like. Such devices may also take the form of other mobile communication devices that may or may not include handsets, such as hands-free communications devices. The various telephone communications network elements collaborate to allow immediate, delayed or blocked transmission of video images to such devices based on subscriber preferences and mobile station capabilities. The network infrastructure and bandwidth to transmit video images from a mobile station are used, with software modifications, to allow subscribers to control the receipt of video at the mobile stations.

In this regard, it is to be appreciated that the modifications to the network; e.g., mobile switching center (MSC) 16, can be accomplished using any of a variety of hardware and software techniques. Appropriate routines can be run in the noted network components, or others, to perform the functions and accomplish the objectives of the present invention. The actual configuration of the network into which the invention is implemented and the objectives of the designers will dictate the precise configuration for the invention. Moreover, modifications to the mobile subscriber database can also be accomplished in known manners. For example, as noted above, data fields can simply be added to the database to allow for the storage of information on subscription information of users, handset information for users and other equipment information, such as delivery preferences, to implement the invention. These, too, would be relatively simple software modifications.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A system to provide transmission of video data from a first mobile station to a second mobile station in a network, the system comprising:
    a mobile switching center, wherein the mobile switching center comprises:
        a call recognition module operative to recognize a call from the first mobile station to the second mobile station as including the video data and, if the video data is present, validate the second mobile station as capable of receiving the video data and determine a delivery preference for the second mobile station based at least in part on information retrieved from at least one database, wherein a subscriber sets the delivery preference by selecting immediate delivery, delayed delivery, blocked delivery, or conditional delivery;
        a storage module operative to have stored therein the video data;
        an announcement module operative to selectively prompt, based on the delivery preference, the second mobile station if the second mobile station is validated, receive a response to the prompt from the second mobile station and selectively forward the response; and,
        a control module operative to store the video data in the storage module upon recognition, receive the response from the announcement module and, based on at least one of the delivery preference and the response, perform at least one of maintaining the video data in the storage module, deleting the video data from the storage module, and forwarding the video data to the second mobile station.

2. The system as set forth in claim 1 wherein the call recognition module validates the second mobile station by performing a look-up operation on a mobile subscriber database.

3. The system as set forth in claim 1 wherein the storage module is a first-in, first-out buffer.

4. The system as set forth in claim 1 wherein the prompt comprises a ringing tone.

5. The system as set forth in claim 1 wherein the prompt comprises an announcement.

6. The system as set forth in claim 1 further comprising a call origination module operative to originate, based on the delivery preference, a subsequent call to the second mobile station to selectively prompt, based on the delivery preference, the second mobile station if the second mobile station is validated, receive the response to the prompt from the second mobile station and selectively forward the response to the control module.

7. The system as set forth in claim 1 wherein the announcement module provides a signal to the first mobile station that delivery will be blocked if the call recognition module does not validate the second mobile station.

8. The system as set forth in claim 1 wherein the control module deletes the video data from the storage module if the call recognition module does not validate the second mobile station.

9. A method for transmitting video data from first mobile station to a second mobile station in a network, the method comprising:
    recognizing a call from the first mobile station to the second mobile station as including the video data, wherein the recognizing is executed within a mobile switching center;
    if the video data is present, validating the second mobile station as capable of receiving the video data and determining a delivery preference for the second mobile station based at least in part on information retrieved from at least one database, wherein a subscriber sets the delivery preference by selecting immediate delivery, delayed delivery, blocked delivery, or conditional delivery, wherein the validating and the determining are executed within the mobile switching center;
    storing the video data in a storage module, wherein the storing is executed within the mobile switching center;
    selectively prompting, based on the delivery preference, the second mobile station if the second mobile station is validated, wherein the prompting is executed within the mobile switching center;
    receiving a response to the prompt from the second mobile station, wherein the receiving is executed within the mobile switching center; and,
    based on at least one of the delivery preference and the response, performing at least one of maintaining the video data in the storage module, deleting the video data from the storage module, and forwarding the video data to the second mobile station, wherein the maintaining, deleting, and forwarding is executed within the mobile switching center.

10. The method as set forth in claim 9 wherein the validating of the second mobile station comprises performing a look-up operation on a mobile subscriber database.

11. The method as set forth in claim 9 wherein the prompting comprises providing a ringing tone.

12. The method as set forth in claim 9 wherein the prompting comprises providing an announcement.

13. The method as set forth in claim 9 wherein the response comprises initiating at least one of a rejection of the video data, a request for immediate delivery of the video data, and a request for delayed delivery of the video data.

14. The method as set forth in claim 9 further comprising:
originating, based on the delivery preference, a subsequent call to the second mobile station;
selectively prompting, based on the delivery preference, the second mobile station if the second mobile station is validated;
receiving the response to the prompt from the second mobile station; and, selectively forwarding the response to the control module.

15. The method as set forth in claim 9 further comprising providing a signal to the first mobile station that delivery will be blocked if the second mobile station is not validated.

16. The method as set forth in claim 9 further comprising deleting the video data from the storage module if the second mobile station is not validated.

17. The system as set forth in claim 1 wherein the response comprises at least one of a rejection of the video data, a request for immediate delivery of the video data, and a request for delayed delivery of the video data.

\* \* \* \* \*